United States Patent [19]
Marchant et al.

[11] Patent Number: 5,478,111
[45] Date of Patent: Dec. 26, 1995

[54] DYNAMIC BURN VENTS FOR THE CUSHION OF AN AIR BAG MODULE

[75] Inventors: Brent Marchant, Ogden; Bradley D. Harris, Farmington, both of Utah

[73] Assignee: Morton International, Inc., Chicago, Ill.

[21] Appl. No.: 105,230

[22] Filed: Aug. 11, 1993

[51] Int. Cl.$^6$ .................................................... B60R 21/30
[52] U.S. Cl. ........................................ 280/739; 280/743.1
[58] Field of Search ................................. 280/728 R, 731, 280/739, 743 R

[56] References Cited

U.S. PATENT DOCUMENTS

| | | | |
|---|---|---|---|
| 3,451,693 | 6/1969 | Carey | 280/150 |
| 3,527,475 | 9/1970 | Carey et al. | 280/150 |
| 3,831,972 | 8/1974 | Allgaier et al. | 280/730 R |
| 3,892,425 | 7/1975 | Sakairi et al. | 280/743 R |
| 4,097,065 | 6/1978 | Okada et al. | 280/743 R |
| 4,805,930 | 2/1989 | Takada | 280/739 |
| 5,016,913 | 5/1991 | Nakajima et al. | 280/738 |
| 5,073,418 | 12/1991 | Thornton et al. | 280/743 R |
| 5,131,434 | 7/1992 | Krummheuer et al. | 280/743 R |
| 5,178,408 | 1/1993 | Barrenscheen et al. | 280/743 R |
| 5,219,179 | 6/1993 | Eyrainer et al. | 280/739 |
| 5,333,903 | 8/1994 | Eyrainer et al. | 280/743.1 |
| 5,370,925 | 12/1994 | Koseki | 280/728 R |

FOREIGN PATENT DOCUMENTS

| | | |
|---|---|---|
| 0495410 | 1/1992 | European Pat. Off. . |
| 0495409 | 1/1992 | European Pat. Off. . |
| 0529371 | 8/1992 | European Pat. Off. . |
| 0536677 | 10/1992 | European Pat. Off. . |
| 9009908 | 9/1990 | WIPO . |

*Primary Examiner*—Margaret A. Focarino
*Assistant Examiner*—Paul N. Dickson
*Attorney, Agent, or Firm*—Mark F. LaMarre; Nick C. Kottis; Gerald K. White

[57] ABSTRACT

An improved device for controlling the rate at which gas is exhausted from an air bag cushion which is used in passenger vehicles. A novel gas vent is incorporated into the material from which the air bag is made, The vent comprises a dynamic vent that is impermeable to gas below a critical temperature and is permeable to gas above a critical temperature. The dynamic vent provides additional venting of gas during a high impact collision or when a larger than average occupant impacts onto the air bag cushion.

10 Claims, 3 Drawing Sheets

DYNAMIC BURN VENTS FOR THE CUSHION OF AN AIR BAG MODULE

BACKGROUND OF THE INVENTION

1. Field of the Invention

This invention relates generally to inflatable-type modular occupant restraint systems for passenger vehicles or, as they are more commonly known, air bag restraint systems. Such a system may be installed in an automobile or other vehicle, at least in part on the steering wheel or adjacent to the driver for the protection of the driver and also in the dashboard or adjacent to an occupant for passenger protection in the event of a collision. More particularly, this invention relates to an improved means for controlling the discharge rate of gas from an air bag cushion and for preventing the over-pressurization of the air bag cushion.

2. Description of Related Art

Air bag restraint systems for restraining the movement of occupants of a motor vehicle during a collision have long been known. The air bag restraint system is located in close proximity to the occupants and normally is in an uninflated condition. In the event of a crash, however, the air bag is inflated in approximately 20 to 40 milliseconds by a gas produced by the burning of a gas generant material in a gas generator or, as it is more commonly known, an inflator. The gas generant is ignited by an initiator. The pressure of combustion gases resulting from the rapid burning of the gas generant material causes gas to rush into the bag to effect a rapid rate of inflation thereof. The gas generated by the inflator is filtered by a filter unit internal to the inflator.

An air bag cushion, which is normally made from a material that may be substantially impermeable to the flow of gas, typically is provided in part thereof with at least one vent port which serves as an outlet for gas contained within the air bag cushion. Alternatively, the air bag cushion may be provided in part thereof with a permeable fabric which functions as an outlet for gas contained within the cushion. The vent port or permeable fabric for typical operating conditions relieves excess pressure from within the air bag cushion to prevent the cushion from bursting and to prevent recoil of an occupant who impacts onto an overpressurized air bag cushion. When the gas generating material is more reactive due to storage at a high temperature; i.e., storage in a vehicle on a bright sunlit day, when the vehicle is involved in a high-energy collision, or when an extremely large occupant is present the vent means may not afford adequate pressure relief for the air bag cushion. It is preferable to provide a secondary pressure relief route to accommodate the release of increased gas pressure in a controlled manner from the air bag cushion.

Solutions to this problem have been accomplished by using rupturable patches, seams or the like which break and open an exhaust vent to relieve excess pressure from within the air bag cushion. Such solutions are disclosed in Takada, U.S. Pat. No. 4,805,930; Okada et al., U.S. Pat. No. 4,097,065; Nakajima et al., U.S. Pat. No. 5,016,913; and Carey et al., U.S. Pat. No. 3,527,475.

As disclosed by Takada, stitched seams between fabric elements of an air bag cushion induce localized distension when the air bag cushion is exposed to excess pressure. The air bag cushion opens up along the seams causing the film coating of the envelope fabric to rupture along the seams. This allows gas to escape and maintain a substantially constant overall maximum pressure, regardless of variation in ambient temperature.

In Okada, the air bag gas vent is covered with a gas-permeable cloth which is provided with at least one dart. When the dart tears, it provides a bulge-out portion to relieve pressure within the air bag cushion to prevent the cushion from bursting.

Heat-shrink material which partially blocks a gas vent is disclosed by Nakajima. The shrink-wrap shrinks to increase the area for the passage of gas from the air bag cushion when gas is introduced into the air bag cushion from the inflator.

A patch covering a gas vent is disclosed in Carey. The patch is made from material which has less strength than the material from which the air bag cushion is made. The patch is attached to the cushion with adhesive or similar means. When the air bag cushion is overpressurized, the patch ruptures along the periphery of the gas vent forming a flap which moves to permit gas to exhaust from the air bag cushion.

SUMMARY OF THE INVENTION

An object of this invention is to provide a secondary pressure relief means for an air bag cushion.

Another object of this invention is to provide a section of the air bag cushion which will give way gradually when exposed to higher temperature gases to open a vent in the air bag cushion in a step-by-step manner.

Another object of this invention is to provide a vent the forming of which is delayed until the air bag cushion is deployed in a position to accept the impact from an occupant of the vehicle.

Another object of this invention is to provide a gas exhaust means which is substantially impermeable to gas under normal air bag cushion deployment conditions, but which gas exhaust means can be made permeable to gas under high pressure conditions while not degrading the overall integrity of the air bag cushion.

These and other objectives of the invention, which will become apparent from the following description, have been achieved by a novel safety air bag cushion for use in passenger vehicles, which air bag cushion is provided with at least one dynamic vent which forms a variable porosity zone. A dynamic vent can cover a discrete vent or the dynamic vent may be formed into the material of the air bag cushion. The latter may be continuous to and may be formed from the same piece of material as the air bag cushion. The dynamic vent is slightly permeable to the generated gas in the air bag cushion below a critical pressure. The dynamic vent opens at a pressure above the critical pressure by the increased flow of gas through the dynamic vent resulting in the melting of the fabric from which the dynamic vent is made.

The air bag cushion for use with this invention is inflated by a gas under pressure provided from an inflator. The air bag cushion comprises a foldable body comprising a first portion, a second portion, and a third portion. The air bag cushion first portion is disposed opposite an occupant of the vehicle when the air bag cushion is inflated. The first portion is made of a cloth that is substantially impermeable to gas. The second portion is attached to the first portion and terminates in a third portion which defines a gas inlet opening of the air bag cushion. The dynamic vent is formed into the fabric of the air bag cushion second portion.

The dynamic vent can be made by forming micropores into the fabric of the air bag cushion second portion. Also, the dynamic vent can be formed into fabric which is used to cover an existing discrete vent. The micropores may be cut into the fabric with a laser or needle punch. Also, the dynamic vent can be created by special weaving of the fabric.

BRIEF DESCRIPTION OF THE DRAWINGS

With this description of the invention, a detailed description follows with reference being made to the accompanying figures of drawing which form part of the specification, in which like parts are designated by the same reference numbers, and of which.

DETAILED DESCRIPTION OF THE INVENTION

Figure 1:
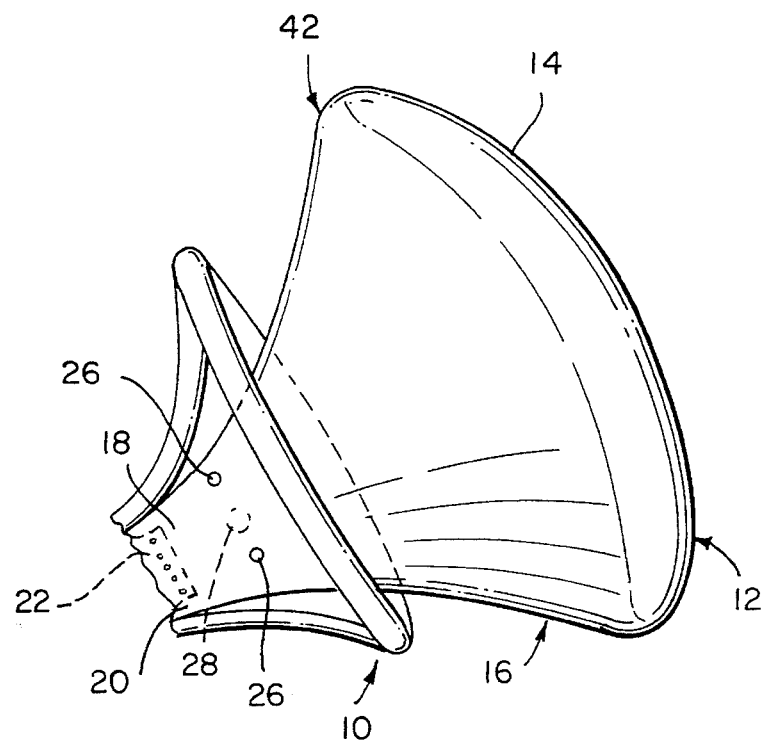
FIG. 1 is a side plan view illustrating a typical driver side air bag cushion in a deployed condition.
Figure 2:
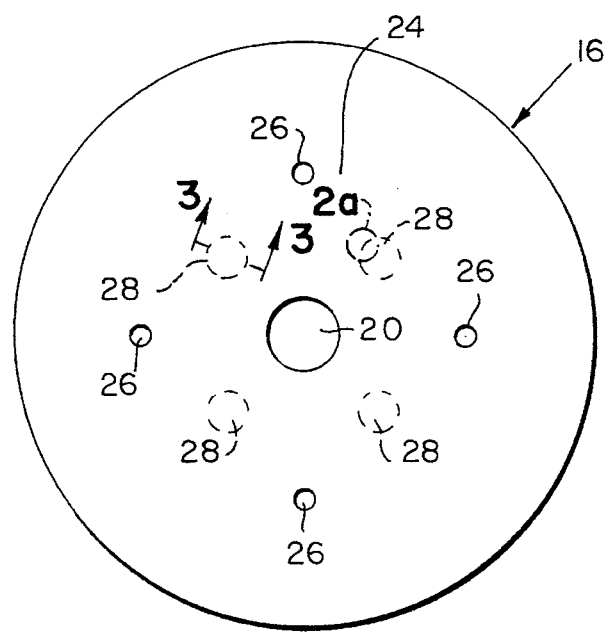
FIG. 2 is a back plan view showing the back portion of the air bag cushion including a dynamic vent.
Figure 6:
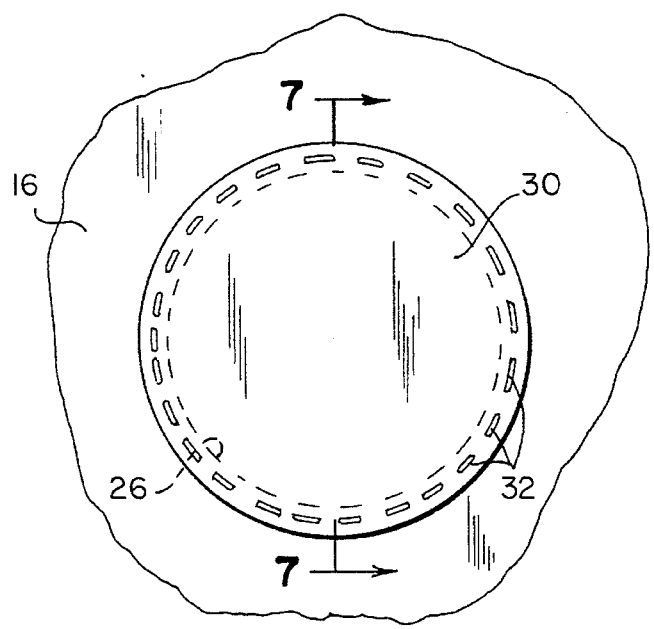
FIG. 6 is a top view of a dynamic vent in covering relation to a discrete vent, which is referred to as a covered vent.
Figure 7:
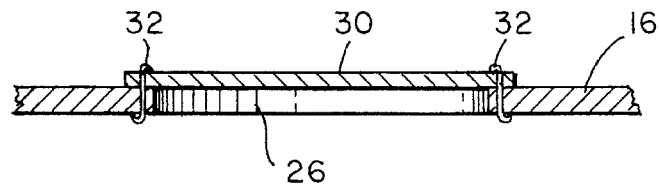
FIG. 7 is a cross-sectional view taken along line 7—7 of FIG. 6 illustrating a dynamic vent in covering relation to a discrete vent.

As best seen in FIG. 1, an air bag cushion module is shown generally at 10 with an automotive air bag cushion 12 in a deployed condition. The air bag cushion 12 includes a first portion 14, a second portion 16, and a third portion 18 defining a gas inlet opening 20 (as shown in FIG. 2) that is provided for receiving a gas for inflation of the air bag cushion 12 provided by an inflator 22. As shown in FIG. 2, the second portion 16 of the air bag cushion 12 comprises a fabric portion 24 with a gas inlet opening 20 provided generally in the central region of the second portion 16 and may include at least one discrete vent port 26 located radially outward of the gas inlet opening 20. The second portion 16 also contains at least one dynamic vent 28 formed into the fabric or covering a discrete vent port 26 (as shown in FIGS. 6 and 7) of the air bag cushion second portion 16 with a dynamic vent patch 30 attached to the air bag cushion second portion stitch 32.

Figure 3:
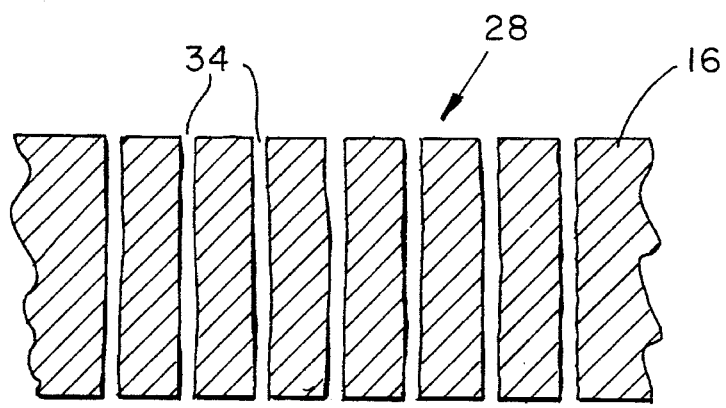
FIG. 3 is a cross-sectional view taken along line 3—3 of FIG. 2 illustrating micropores.
Figure 5:
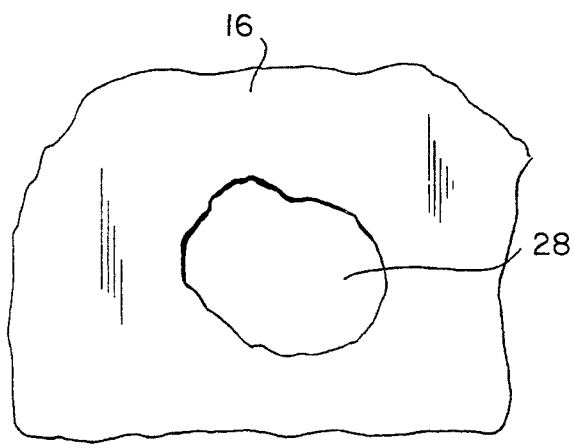
FIG. 5 is a fragmented view of an air bag cushion having a dynamic vent which has burned through illustrating the venting feature of this invention.

The dynamic vent 28 comprises a section of fabric within the fabric of the air bag cushion second portion 16 which is slightly permeable to generated gas at normal operating pressures. By slightly permeable is meant herein, a fabric having a porosity of from about 200 to about 500 cfm/ft$^2$ at a pressure of one-half inch of water. At a critical pressure which is above normal operating pressures, the flow of generated gas through the dynamic vent 28 at normal operating temperatures results in the melting and/or burning of the fabric of the dynamic vent 28 causing the dynamic vent 28 to open as shown in FIG. 5. The melting of the fabric of the dynamic vent 28 can be accomplished by reducing the strength or increasing the porosity of the dynamic vent 28 thereby making the fabric susceptible to degradation by melting, The strength of the fabric from which the dynamic vent 28 is made can be reduced by creating microholes or micropores 34 in the fabric, as shown in FIG. 3. Micropores 34 are used to make impermeable fabric slightly permeable in localized areas, by adjusting micropore 34 size and spacing. The presence of the micropores 34 makes the fabric of the dynamic vent 28 more susceptible to degradation by high temperature gases such that the dynamic vent 28 will burn through when exposed to generated gas at pressures above critical pressures. The burned through dynamic vent 28 shown in FIG. 5 provides additional exhaust vents through which the generated gas can exit the air bag cushion 12, thus relieving pressure from within the air bag cushion 12.

Micropores 34 can Be formed in the fabric of the air bag cushion second portion 16 by using a number of manufacturing techniques known in the textile industry. For example, but not limited to, the micropores 34 can be formed in the fabric by laser energy. A laser is used to place a number of micropores 34 in the fabric. Also, micropores 34 can be formed in the fabric from which the dynamic vent 28 is made by means of a needle punch. The micropores 34 formed by laser or needle punch are such that the fabric is still substantially impermeable as defined herein.

Figure 4:
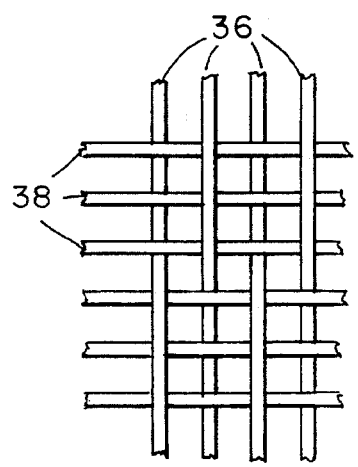
FIG. 4 is a top plan view illustrating a dynamic vent formed by a three-over-one weave.

Further, the strength of the fabric from which the dynamic vent 28 is made can be reduced by specialized weaving of the material from which the air bag cushion 12 is made. For example, fabric is normally woven by a first thread passing over a second thread, and perpendicular to the second thread, then under a third thread, over a fourth thread, and so on. This is referred to herein as an one-over-one weave. The one-over-one weave would normally provide the strongest material. To weaken the fabric slightly a different weave may be used. For example, as shown in FIG. 4, a thread (hereinafter "first thread") 36 may be passed over three adjacent threads (hereinafter "second threads 38") perpendicular to the second threads 38, then under the next three treads, then over the subsequent three threads, and so on. This one-over-three weave produces a weaker fabric. Should the first thread 36 break or burn through, the second threads 38 would be free to move from side to side thus forming gaps through which gas could pass thereby increasing the burning rate of adjacent threads. A one-over-three weave is presented herein as an example. However, other weave patterns such as, but not limited to, a one-over-two weave, a one-over-four weave, a two-over-three weave, or a two-over-four weave may be used.

To aid in the burn through of the first threads 36 a thread thinner than that used for the second thread 38 can be used. In addition, a less heat resistant fabric can be used as the first thread 36. For example, the first thread 36 may be formed from Nylon 6, glass, vinyl coated fiberglass, or polyester, while the second thread 38 may be formed from Nylon 66.

Alternatively, the strength of the fabric in the area defined by the dynamic vent 28 may be reduced by decreasing the number of threads per inch relative to the overall air bag cushion 12. For example, but not limited to, while the air bag cushion 12 is normally formed from fabric having 50 threads per inch, the fabric of the dynamic vent 28 could be formed by fabric having 40 threads per inch. This would reduce the strength of the dynamic vent 28 by 20% compared to the fabric of the overall air bag cushion 12. Also, thinner thread could be used to form the fabric from which the dynamic vent 28 is made.

The dynamic vent 28 formed into the fabric of the air bag cushion second portion 16 or as a dynamic vent patch 30 in covering relation to a discrete vent 26, as shown in FIGS. 6 and 7, may be formed by any of the aforementioned methods.

Figure 2A:
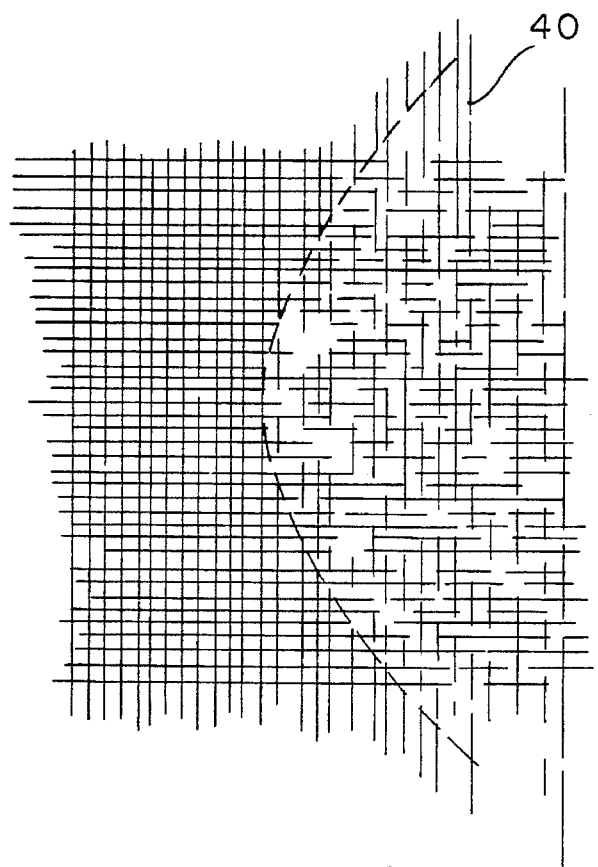
FIG. 2a is an enlarged view taken from section 2a of FIG. 2 illustrating the difference between the fabric of the air bag cushion and the fabric of the dynamic vent and showing one form of micropores.

It is believed that gas at normal operating temperatures and pressures above the critical pressure will result in a gas flow which will cause the threads 40, as shown in FIG. 2a, of the fabric from which the dynamic vent 28 is made to melt and disintegrate. As threads 40 disintegrate, the volumetric flow rate of the gas through the dynamic vent 28 increases further thereby causing disintegration of more threads 40. This cycle continues until the dynamic vent 28 has burned through as shown in FIG. 5.

The dynamic vent of this invention can be used with any air bag cushion 12 known in the art, either a driver side air bag cushion 12 or a passenger side air bag cushion. The air bag cushion may be made from glass, fiberglass, nylon 66, nylon 6, vinyl coated fiberglass, or polyester. The dynamic vent 28 should be located in close proximity to the air bag cushion third portion 18, preferably no more than one-third of the distance along the air bag cushion second portion 16 between the third portion 18 and the section of the maximum radius 42, as shown in FIG. 1, of the air bag cushion 12 occurs. More preferably, the dynamic vent 28 should be located no more than one-fourth of the distance along the air bag cushion second portion 16 between the third portion 18 and the section of maximum radius 42. If the dynamic vent 28 is located in close proximity (from about 2 inches to about 6 inches) to the gas inlet opening 20 the dynamic vent 28 should be designed such that it does not burn through before the air bag cushion 12 is fully deployed, i.e., from about 40 to about 70 milliseconds after the collision of the vehicle with another object. Also, in driver side applications the dynamic vent should be placed on that section of the air bag cushion second portion 16 located between the instrument panel and the steering wheel in order to avoid possible injury to the driver due to exhaust gases.

The dynamic vent 28 of this invention can be used with any inflator 22 known in the art. The inflator 22 can be any of a number of known constructions, including the construction illustrated in U.S. Pat. No. 4,296,084 to Schneiter, which patent is assigned to the assignee of the present invention.

The automotive air bag cushion 12 with the dynamic vent 28 of this invention may be stored in the steering wheel or adjacent to the driver for the protection of the driver, and also in the dashboard, the passenger side instrument panel, or adjacent to the passenger for passenger protection in the event of a collision. A signal from a crash sensor triggers the generation of gas by the inflator 22. Normally, as pressure builds within the expanding air bag a portion of the gas is exhausted through the vent holes of the air bag. As the collision proceeds, an occupant of the vehicle impacts onto the air bag cushion, resulting in additional gas being discharged through exhaust vents. When the air bag module 10 has been stored at elevated temperatures the gas generated by the gas generant exits the inflator 22 at a slightly higher temperature. The increased temperature of the gas in combination with the increased pressure forces gas through the normal exhaust vents and through the fabric of the dynamic vent 28. The fabric of the dynamic vent 28 is designed to burn through under these conditions. As the fabric of the dynamic vent 28 burns through, the flow rate of the higher temperature gas accelerates the degradation of the fabric in the variable porosity zone. As the degradation of the fabric is completed, an additional vent or vents are formed to exhaust gas from the air bag cushion 12, thus permitting the pressure within the air bag cushion 12 to be reduced.

Similarly, during a high-energy collision the impact of an occupant against the air bag cushion 12 caused heated gas to be forced through the fabric of the dynamic vent 28, thereby initiating the burn-through process. In a process similar that discussed in the preceding paragraph, the fabric of the dynamic vent 28 burns through thus creating additional exhaust vents in the air bag cushion 12 to relieve excess pressure within the air bag cushion 12.

Thus, in accordance with the invention, there has been provided a secondary pressure relief means for an air bag cushion. There has also been provided a section of the air bag cushion which will give way gradually when exposed to higher temperature gases to open a vent in the air bag cushion in a step-by-step manner. There has also been provided a gas exhaust means which is substantially impermeable to gas under normal air bag cushion deployment conditions, but which exhaust means can be made permeable to gas under high pressure conditions while not degrading the overall integrity of the air bag cushion.

With this description of the invention in detail, those skilled in the art will appreciate that modification may be made to the invention without departing from the spirit thereof. Therefore, it is not intended that the scope of the invention be limited to the specific embodiments that have been illustrated and described. Rather, it is intended that the scope to the invention be determined by the scope of the appended claims.

We claim:

1. A safety air bag cushion for use in passenger vehicles, which air bag is inflated by the flow of a hot gas under pressure provided from an inflator, said air bag cushion comprising:

a foldable body comprising a first portion, a second portion, and a third portion, said first portion disposed opposite an occupant of the vehicle when said air bag cushion is inflated and being substantially impermeable to gas, said second portion attached to said first portion and terminating in said third portion, said third portion defining a gas inlet opening for said air bag cushion, wherein said first portion, said second portion, and said third portion are made of fabric;

at least one vent formed into said second portion of said air bag cushion; and at least one dynamic vent in covering relationship to said vent in said second portion, wherein said dynamic vent is made of a fabric which is slightly permeable to said hot gas at a pressure below a critical pressure and wherein at a pressure above said critical pressure said dynamic vent is opened by the flow of hot gas through said dynamic vent causing the fabric of the dynamic vent to melt.

2. The safety air bag cushion of claim 1 wherein the fabric from which the air bag cushion is formed is made from glass, fiberglass, nylon 66, nylon 6, vinyl coated fiberglass, or polyester.

3. The safety air bag cushion of claim 1 wherein the fabric from which said dynamic vent is made is formed by a one-over-three weave.

4. The safety air bag cushion of claim 1 wherein said dynamic vent is made by forming micropores into the fabric from which the safety air bag cushion is made by the use of a laser.

5. The safety air bag cushion of claim 1 wherein the fabric from which said air bag cushion is made has 50 threads per inch and the fabric from which the dynamic vent is made has 40 threads per inch.

6. A safety air bag cushion for use in passenger vehicles, which air bag is inflated by the flow of a hot gas under pressure provided from an inflator, said air bag cushion comprising:

a foldable body comprising a first portion, a second portion, and a third portion, said first portion disposed opposite an occupant of the vehicle when said air bag cushion is inflated, and being substantially impermeable to gas, said second portion attached to said first portion and terminating in said third portion, said third portion defining a gas inlet opening for said air bag cushion; and at least one dynamic vent formed in said second portion wherein said dynamic vent is slightly permeable to the generated gas at a pressure below a critical pressure and wherein at a pressure above said critical pressure said dynamic vent is opened by the flow of hot gas through said dynamic vent causing the fabric of said dynamic vent to melt.

7. The safety air bag cushion of claim 6 wherein the fabric from which the air bag cushion is formed is made from glass, fiberglass, nylon 66, nylon 6, vinyl coated fiberglass, or polyester.

8. The safety air bag cushion of claim 6 wherein the fabric from which said dynamic vent is made is formed by an one-over-three weave.

9. The safety air bag cushion of claim 6 wherein said dynamic vent is made by forming micropores into the fabric from which the safety air bag cushion is made by the use of a laser.

10. The safety air bag cushion of claim 6 wherein the fabric from which said air bag cushion is made has 50 threads per inch and the fabric from which the dynamic vent is made has 40 threads per inch.

* * * * *